United States Patent

Neilson

[15] 3,675,729
[45] July 11, 1972

[54] BIT LUBRICATION SYSTEM
[72] Inventor: William J. Neilson, Whittier, Calif.
[73] Assignee: Smith International Incorporated, Newport Beach, Calif.
[22] Filed: May 8, 1970
[21] Appl. No.: 35,729

[52] U.S. Cl.................175/228, 175/53, 175/344, 175/372, 184/39, 308/8.2
[51] Int. Cl.................E21b 9/08, F16c 19/00
[58] Field of Search.................175/227, 228, 229, 334, 371; 308/8.2; 184/1 R, 7 R, 6 R, 29, 81, 39

[56] References Cited

UNITED STATES PATENTS

| | | | |
|---|---|---|---|
| 3,220,496 | 11/1965 | Beck | 184/7 X |
| 3,078,960 | 2/1963 | Minton | 184/81 |
| 3,203,492 | 8/1965 | Lichte | 308/8.2 X |
| 2,170,228 | 8/1939 | Aikman | 184/29 |
| 1,551,366 | 8/1925 | Carlson | 308/8.2 |
| 2,751,196 | 6/1956 | Smith | 175/228 |
| 3,419,093 | 12/1968 | Lichte et al. | 175/228 |
| 3,389,760 | 6/1968 | Morris | 308/8.2 X |
| 2,187,037 | 1/1940 | Kirkpatrick | 308/8.2 |
| 1,943,699 | 1/1934 | Snell, Jr. | 175/227 X |
| 1,320,394 | 11/1919 | Hughes | 175/227 |
| 1,532,178 | 4/1925 | Godbold | 175/229 X |
| 3,029,881 | 4/1962 | Swart | 175/228 |
| 3,299,973 | 1/1967 | Swart et al. | 175/371 |
| 3,285,355 | 11/1966 | Neilson et al. | 175/334 |

Primary Examiner—Manuel A. Antonakas
Attorney—Christie, Parker & Hale

[57] ABSTRACT

A raise type of earth boring drill for drilling upwardly from an adit or other tunnel is described. The bit is rotated by a drill pipe in a vertical pilot hole, and bores through the earth by means of rolling cutters mounted on the drill bit. Lubrication for the bearings supporting the cutters is provided from a reservoir of lubricant through lubricant manifolds to the individual cutters. A piston in the reservoir is intermittently actuated by pneumatic pressure for giving each of the bearings a small injection of lubricant, thereby obviating any need for complex and troublesome metering systems in the drill bit.

9 Claims, 3 Drawing Figures

PATENTED JUL 11 1972 3,675,729
SHEET 1 OF 2
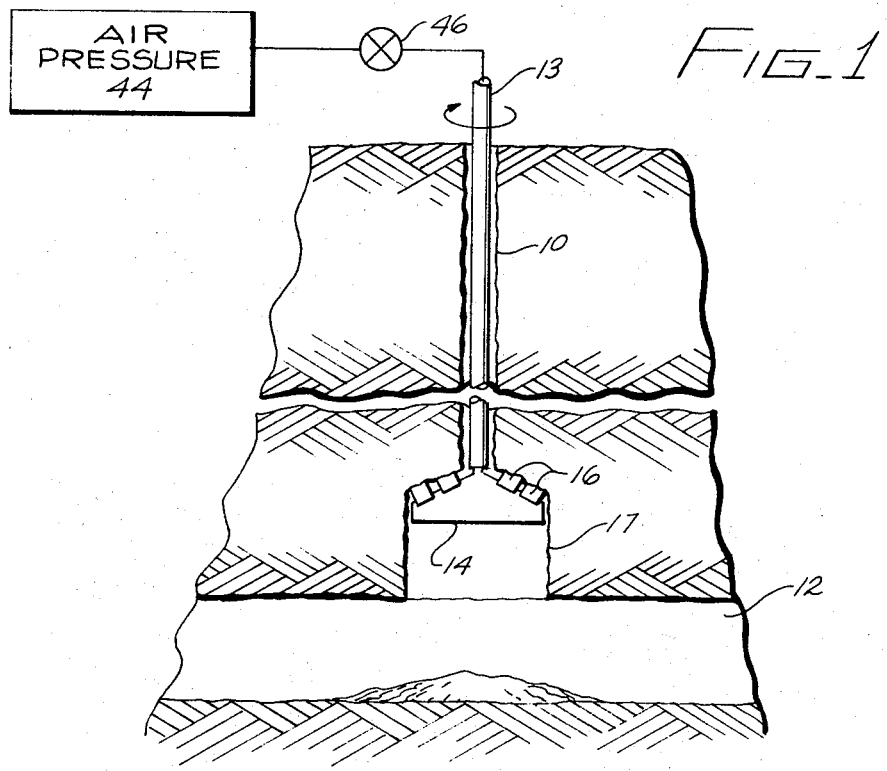
FIG_1
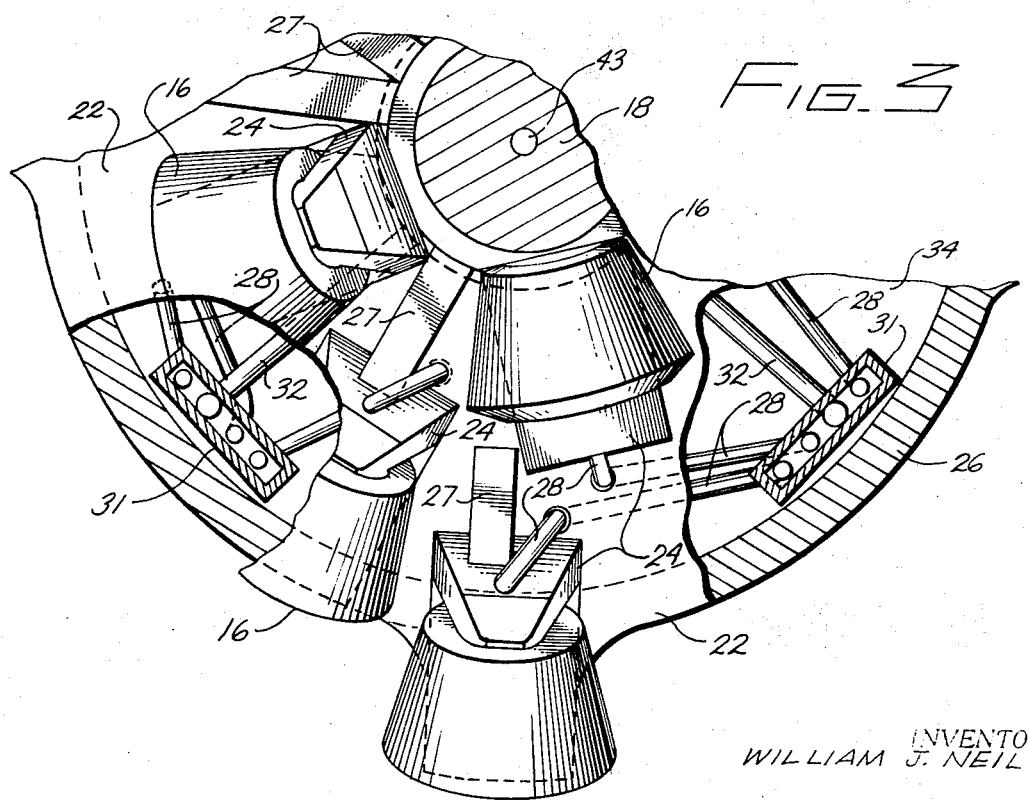
FIG_3
INVENTOR.
WILLIAM J. NEILSON
BY
Christie, Parker & Hale
ATTORNEYS

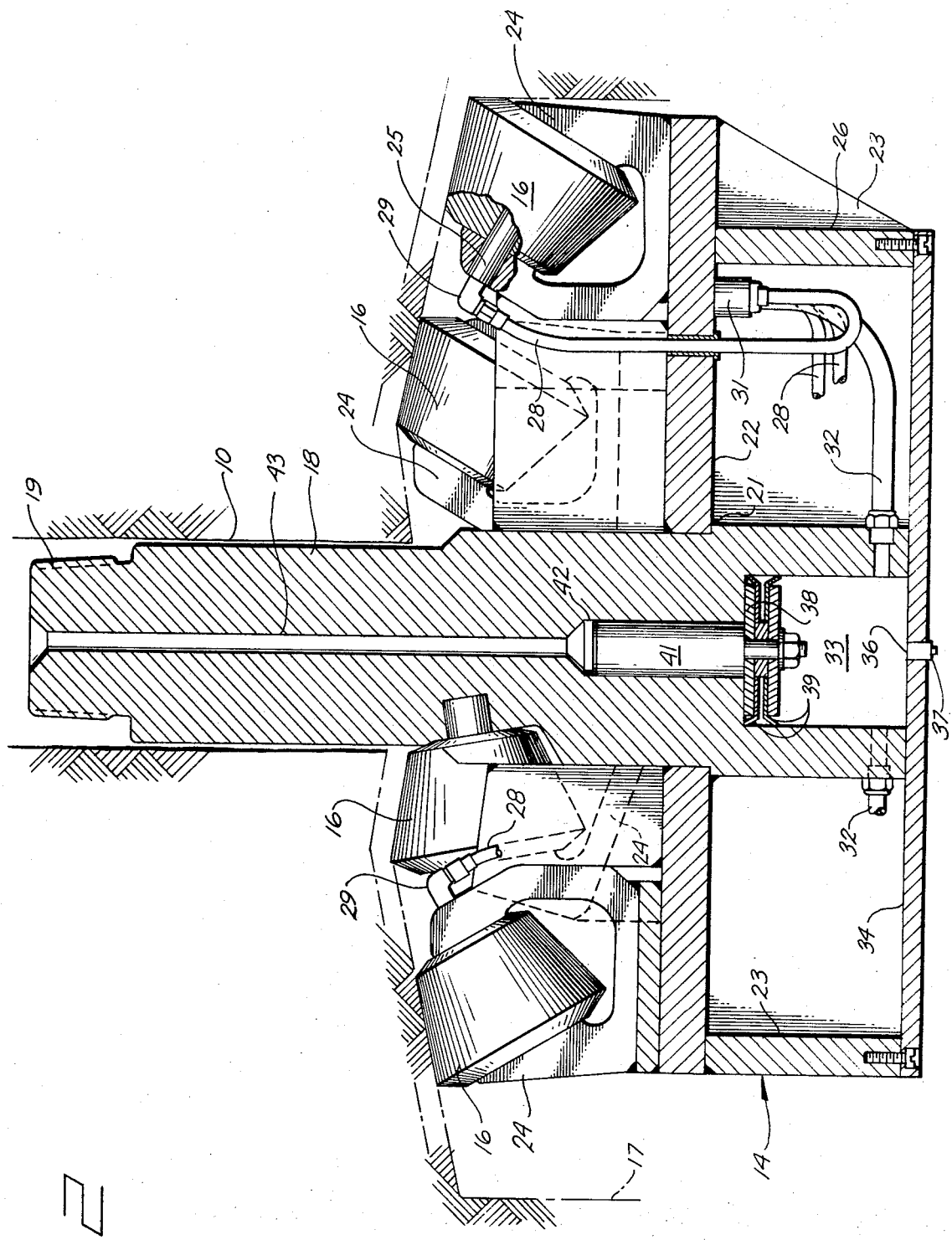

BIT LUBRICATION SYSTEM

BACKGROUND

Earth boring bits often employ hardened rolling cutters for pulverizing rock and other material encountered in drilling through the earth. These rolling cutters are subject to high pressures and are mounted on sturdy bearings for continued free rotation during use. Wear and destruction of the bearings is countered by providing the lubrication for the bearings. In general, it has been found that permanently lubricated bearings are not satisfactory, so that additional lubrication during use is desirable.

In the downward drilling of oil and gas wells or the like, a continuous pressure of drilling fluid is applied at the cutting bit for cooling, carrying away debris and the like. This pressure has been employed for causing lubricant to flow to the cutter bearings. Since, however, the pressure is continuously applied, metering arrangements have been employed for regulating the flow of lubricant to the bearings, both to maintain adequate lubrication and to avoid premature depletion of lubricant stored in the drilling bit. Metering orifices and long narrow tubes having controlled resistance to fluid flow have been suggested for such applications. These present difficulties in that plugging occurs in the small passages through which the lubricant must flow, and the response of such systems depends greatly on lubricant viscosity. The viscosity of a lubricant varies significantly with temperature, and in the drilling environment, substantial temperature differences from one operation to another are encountered. It is, therefore, necessary to employ special lubricants compatible with the temperatures encountered in a particular drilling operation. Lubricant flow in such a system is also dependent on the flow properties of the drilling fluid since the pressure differential of the drilling fluid as it leaves the drill bit provides the force required to move the lubricant. If the drilling fluid viscosity changes significantly, the quantity of lubricant employed can also change significantly.

In a raise-type earth boring drill, a drilling fluid may be dispensed with in some circumstances, and the resultant pressure is not available for causing lubricant flow.

It is, therefore, highly desirable to provide a lubrication system for a drill bit, particularly a raise-type bit, independent of properties or presence of a drilling fluid.

BRIEF SUMMARY OF THE INVENTION

In practice of this invention according to a preferred embodiment there is provided a raise earth boring drill for connection to a drill string. The drill has a plurality of roller cutters each mounted on a bearing, and an improved means for lubricating the bearings comprising a lubricant reservoir, a piston in the reservoir, a plurality of lubricant flow tubes substantially free of flow restriction between the lubricant reservoir and the several bearings, a passage from the connection to the drill string to the piston and means for intermittently applying pneumatic pressure in the passage whereby the piston causes lubricant to flow from the reservoir through the tubes to the bearings.

DRAWINGS

Features and advantages of this invention will be appreciated as the same becomes better understood by reference to the following detailed description when considered in connection with the accompanying drawings wherein:

FIG. 1 illustrates schematically a bit lubrication system incorporating principles of this invention;

FIG. 2 illustrates in transverse cross section a raise-type earth boring drill; and FIG. 3 illustrates a fragment of the face of the drill bit of FIG. 2 partly cut away to show certain aspects of the lubrication system.

Throughout the drawings like numerals refer to like parts.

DESCRIPTION

A raise earth boring drill is employed for making a raise in mining, tunneling or the like. A raise is a shaft extending upwardly from an adit or tunnel. In the context of the raise drill provided in practice of this invention a relatively small diameter pilot hole is drilled from the ground surface or an upper tunnel down to a lower tunnel and then the drill bit is drawn up from the lower tunnel toward the higher tunnel or ground surface, drilling a relatively large raise as it goes up.

FIG. 1 illustrates schematically such an arrangement for drilling a raise. As illustrated in this embodiment, a pilot hole 10 is provided from the ground surface 11, for example, to a tunnel or adit 12. A drill pipe 13 is passed downwardly through the pilot hole 10 into the tunnel and a raise earth boring drill bit 14 is connected to the lower end. Means (not shown) are provided at the surface 11 for rotating the pipe 13 (known as a drill string) so as to activate the drill bit 14. The drilling mechanisms for turning the drill string 13 and at the same time applying a lifting force are well known and not further described herein. As the drill bit is rotated, conventional roller cutters 16 pulverize the rock, and the pulverized rock falls into the tunnel 12 from which it is removed. As the raise drill bit is brought towards the surface, a vertically extending raise 17 is drilled.

FIGS. 2 and 3 illustrate in greater detail the raise drill bit 14. The drill bit comprises a central shaft 18 having a threaded portion 19 on the end for connection to the pipe of the drill string 13 (FIG. 1). A shoulder 21 on the lower end of the pilot shaft 18 supports an approximately circular heavy steel plate 22 forming the main frame of the drill bit. A circular reinforcing ring 26 and additional stiffening webs 23 and similar reinforcement are provided on the back or lower face of the frame 22.

Mounted on the upper face of the plate 22 are a plurality of generally U-shaped yokes 24, each of which provides bearing support for one of the conventional roller cutters 16 mounted on an axially removable load pin 25. The roller cutters 16 are illustrated merely as smooth truncated cones; however, it will be recognized by one skilled in the art that such cutters have a plurality of hardened steel or tungsten carbide teeth for pulverizing the rock. Stiffening webs 27 are provided between the bearing yokes 24 and the central shaft 18 for accommodating the heavy thrust loads imposed on the cutters during operation. In order to recognize the magnitude of the loads and problems thereby encountered, it should be noted that in one embodiment the pilot hole may be about 11 inches in diameter and the raise drill about 5 feet in diameter with each of a dozen cutters extending 6 to 8 inches along a radius of the drill.

Because of high loads imposed on cutter bearings, continual lubrication is required. In order to provide such lubrication, a lubricant conduit 28 is connected to each load pin 25 by a conventional fitting 29 (shown only in FIG. 2). Flow passages within the load pin to the bearings for the cutter are all conventional. Conduits 28 from three of the yoke-load pin-cutter assemblies are brought to a fluid manifold 31 to which a larger conduit 32 is connected. In a typical embodiment, the raise drill may have 12 cutters spaced at different radial distances from the central shaft and four such three-conduit manifolds are employed. The larger tube 32 from each of the manifolds 31 is in fluid communication with a lubricant reservoir 33 in the lower end of the central shaft 18.

The tubes 28 and 32 and the manifolds 31 have a substantial cross section so that they do not substantially restrict flow of lubricant of the usual viscosities used. The bearings within the cutters are normally provided with grease seals which serve to prevent free flow of lubricant from the system. There is substantial resistance to lubricant flow due to the seals and bearings and there is substantially less flow resistance in the tubes and manifolds than in the mounts for the cutters. Previously flow between a reservoir and the cutters has been restricted by metering arrangements in the intermediate flow lines. Such flow restrictions are avoided in practice of this invention, the only restriction being that inherent in the seals and bearings in the cutter assemblies.

The reservoir 33 is in the form of a cylindrical cavity in the pilot shaft 18, filled with a conventional heavy grease or other suitable bearing lubricant (not shown). A cover plate 34 fastened to the reinforcing ring 26 closes one end of the lubricant reservoir 33 and a central hole 36 is provided for filling the reservoir with lubricant. In the illustrated embodiment, a plug 37 is provided in the hole 36; however, it will be recognized that if desired a check valve type of filling device can be employed. It will also be recognized that during operation of the drill bit as it moves up the raise, the lower end of the drill bit is accessible and lubricant can be added through the hole 36 as required to replace lubricant depleted in operation of the system.

A piston 38 having a pair of opposed seals 39 is mounted in the lubricant reservoir 33. This relatively larger diameter piston is rigidly connected to a smaller diameter plunger 41 having a length substantially greater than its diameter. The plunger 41 is fitted within a cylindrical guide passage 42 which maintains the piston in alignment with the reservoir and prevents cocking. An axial passage 43 through the pilot shaft 18 provides air communication between the guide passage 42 and the interior of the drill string tubing 13 (FIG. 1).

The principal loads between the cutter 16 and the face of the raise are transmitted to the pilot shaft 18 by way of the heavy plate 22 of the frame. Since these loads are large, the thickness of the pilot shaft 18 is preferably large down to at least the point where the plate 22 is connected. Therefore, in order to provide a reasonable size reservoir for lubricant, a relatively larger diameter cylindrical cavity 33 is provided at the lower end of the pilot shaft 18 where the loads are relatively lighter. A smaller diameter guide passage 42 is provided in the region where stresses on the pilot shaft are greater.

Referring again to FIG. 1, a source of air pressure 44 is connected to the interior of the drill string tubing by a valve 46 so that when the valve is open pneumatic pressure is applied to the interior of the drill string, and hence through the axial passage 43 and guide passage 42 to the piston 38.

During operation, the drill string 13 is rotated, thereby causing the drill bit 14 to rotate and the cutters 16 to pulverize rock. When it is desired to lubricate the bearings in the cutters, the valve 46 is opened, thereby applying pneumatic pressure to the piston 38. This pneumatic pressure displaces lubricant from the reservoir 33 through the tubing 32 to the lubricant manifolds 31. From the lubricant manifolds 31 the lubricant flows through the tubing 28 to the individual load pins 25 on which the cutters 16 are mounted. The tubes 32 and 28 are substantially free of flow restrictions or metering arrangements so that the flow of lubricant therethrough does not depend on the viscosity of the lubricant. Being of relatively large diameter and free of flow restriction, any possible problems with plugging of the conduits is avoided. The quantity of lubricant flowing to the individual bearings is not dependent on the viscous flow characteristics of the lubricant but can be controlled by controlling the air pressure applied by way of the valve 46. It will be apparent that the valve 46 can be either manually operated or automatically operated on an intermittent basis so that lubricant is provided at regular intervals to the bearings supporting the cutters.

As an alternative to the arrangement having a piston in the lubricant reservoir, an arrangement particularly well suited to a raise drill deletes the piston in the reservoir. In this embodiment the reservoir 33, guide passage 42, axial passage 43, and so much of the drill string tubing as may be desired is filled with a lubricant having a sufficiently low viscosity that it essentially flows as a liquid under its own weight even if very slowly. In such an arrangement, lubricant flows from the reservoir through the distributing manifolds 31 to the individual bearings. The flow can be solely due to the head of lubricant in the drill string if the contained volume of lubricant is high enough, so that the bearings are continuously lubricated by a slow flow of lubricant. Even in an embodiment without a piston, however, it is preferred to employ a lubricant that will not flow under its own weight against the resistance of the bearings themselves, and in this case, a pneumatic pressure applied from the surface at intermittent intervals forces lubricant to flow from the reservoir to the bearings.

Many modifications and variations of a bit lubricating system incorporating principles of this invention will be apparent to one skilled in the art. It is, therefore, to be understood that within the scope of the appended claims, the invention may be practiced otherwise than as specifically described.

What is claimed is:

1. A raise drill comprising:
   a drill bit frame;
   a pilot shaft mounted on the frame;
   means for connecting the shaft to a drill support string;
   means for mounting a plurality of roller cutters on the frame;
   a roller cutter mounted for rotation on each means for mounting for collectively cutting rock over the face of a raise;
   a lubricant reservoir;
   a plurality of tube means between the reservoir and each of the means for mounting for conveying lubricant therebetween, the tube means having substantially less restriction to lubricant flow than the means for mounting;
   a lubricant displacing piston in the reservoir; and
   a fluid passage through the shaft and in fluid communication with the piston in the lubricant reservoir.

2. A raise drill as defined in claim 1 wherein the lubricant reservoir comprises a cylindrical chamber in the lower end of the pilot shaft and further comprising:
   a cylindrical guide passage in the pilot shaft aligned with the lubricant reservoir and having a diameter smaller than the reservoir; and wherein
   the piston includes a cylindrical extension fitted in the guide passage.

3. A raise drill as defined in claim 2 further comprising:
   a lubricant manifold in fluid communication with the tube means; and
   a conduit in fluid communication between the lubricant reservoir and the lubricant manifold.

4. A raise drill as defined in claim 3 further comprising:
   a cover plate closing the lower end of the lubricant reservoir; and
   aperture means through the cover plate for replenishing lubricant in the reservOir.

5. A raise drill as defined in claim 1 further comprising:
   a lubricant manifold in fluid communication with the tube means; and
   a conduit in fluid communication between the lubricant reservoir and the lubricant manifold.

6. In a raise earth boring drill comprising a shaft for connection to a drill string, a mounting frame on the shaft, a plurality of roller cutter yokes mounted on the frame, a roller cutter mounted on each roller cutter yoke for collectively cutting earth over the face of a raise, and a bearing between each roller cutter and its respective yoke, the improvement comprising means for lubricating the bearings during periods of use of the drill comprising:
   a lubricant reservoir;
   a piston in the lubricant reservoir having a side in contact with lubricant in the reservoir;
   a plurality of tubes substantially free of flow restriction, each having a first end in fluid communication with the lubricant reservoir and a second end in fluid communication with one of the bearings;
   a passage through the drill shaft in fluid communication with the opposite side of the piston from the lubricant in the reservoir; and
   means for intermittently applying pneumatic pressure in the passage.

7. In a raise earth boring drill comprising a shaft for connection to a drill string, a mounting frame on the shaft, a plurality of roller cutter yokes mounted on the frame, a roller cutter mounted on each roller cutter yoke for collectively cutting earth over the face of a raise, and a bearing between each roller cutter and its respective yoke, the improvement comprising means for lubricating the bearings during periods of use of the drill comprising:
  a lubricant reservoir;
  a piston in the lubricant reservoir having a side in contact with lubricant in the reservoir;
  a plurality of tubes substantially free of flow restriction, each having a first end in fluid communication with the lubricant reservoir and a second end in fluid communication with one of the bearings;
  a passage through the drill shaft in fluid communication with the opposite side of the piston from the lubricant in the reservoir;
  means for intermittently applying pneumatic pressure in the passage; and
  a lubricant manifold having an inlet connected to tube means for conducting lubricant from the reservoir and a plurality of outlets connected to tube means for conducting lubricant to the bearings.

8. In a raise earth boring drill comprising a shaft for connection to a drill string, a mounting frame on the shaft, a plurality of roller cutter yokes mounted on the frame, a roller cutter mounted on each roller cutter yoke for collectively cutting earth over the face of a raise, and a bearing between each roller cutter and its respective yoke, the improvement comprising means for lubricating the bearings during periods of use of the drill comprising:
  a lubricant reservoir;
  a piston in the lubricant reservoir having a side in contact with lubricant in the reservoir;
  a plurality of tubes substantially free of flow restriction, each having a first end in fluid communication with the lubricant reservoir and a second end in fluid communication with one of the bearings;
  a passage through the drill shaft in fluid communication with the opposite side of the piston from the lubricant in the reservoir; and
  means for intermittently applying pneumatic pressure in the passage; and wherein
  the lubricant reservoir comprises a cavity in the pilot shaft,
  the passage comprises an axial bore in the pilot shaft, and
  the piston further comprises a reduced diameter guide piston aligned with the piston for preventing cocking thereof.

9. In an improved combination as defined in claim 7, means for replacing lubricant in the reservoir from the lower side of the drill as used in a raise.

* * * * *